Dec. 12, 1967    C. L. LEBLANC ET AL    3,357,568
DISPLAY RACK

Filed July 28, 1965    2 Sheets-Sheet 1

INVENTORS.
CONRAD L. LEBLANC
and JACK BLOCH
BY *Patrick L. Henry*

ATTORNEY.

Dec. 12, 1967   C. L. LEBLANC ET AL   3,357,568
DISPLAY RACK

Filed July 28, 1965   2 Sheets-Sheet 2

INVENTORS.
CONRAD L. LEBLANC
and JACK BLOCH

BY   ATTORNEY.

3,357,568
DISPLAY RACK
Conrad L. Leblanc and Jack Bloch, Leominster, Mass., assignors to Foster Grant Co., Inc., Leominster, Mass., a corporation of Delaware
Filed July 28, 1965, Ser. No. 475,415
3 Claims. (Cl. 211—13)

This invention relates to a display rack, and more particularly to a display rack having removable panels releasably retained thereon.

The invention is especially adapted for use as a display rack for sunglasses and the like whereby an entire display panel can be slipped into and releasably retained in place on the display rack. While the presently preferred embodiment is exemplified as a display rack for sunglasses, it will be apparent that the display rack of this invention may be used in conjunction with other articles subject to display in a similar manner.

It is therefore an object of this invention to provide a novel display rack adapted to be releasably retain a display panel thereon.

It is another object of this invention to provide a display panel which is designed to be easily inserted into and removed from a display rack.

The foregoing and other objects are achieved in a display rack having a hub member rotatably mounted on a base member. The hub member includes a plurality of spokes extending radially outwardly therefrom. The spokes are vertically spaced on the hub, and with the hub, form a skeleton for the support of display panels thereon. The panels preferably include a plurality of display sections, and also include guides corresponding to the spokes on the hub, whereby the display panels are supported on the spoke members of the rack. Each panel is releasably retained on the spoke members due to cooperating retaining means on the spoke members and the guides to releasably retain the display panel on the rack. By this apparatus a supply of articles may be shipped to the retailer in a display which serves as a package during shipment of the articles. The panel containing many articles, may then be inserted into the display rack at its destination. In this manner the retailer is provided with attractive display panels which may be inserted into a display rack skeleton quickly and easily to provide an attractive display. Alternatively, the entire display rack may be assembled at the factory and shipped to its destination.

By the above outlined device, several advantages are obtained. The display rack skeleton may be quickly and easily filled with a plurality of display panels, each containing a large number of articles to be displayed. Replacements are facilitated by merely removing an old panel and replacing it with a new one—the new panel having served as a cushioning package en route from the factory.

Other objects and features of the invention will become apparent by reference to the following specification and drawings of the presently preferred embodiment.

Figure 1:
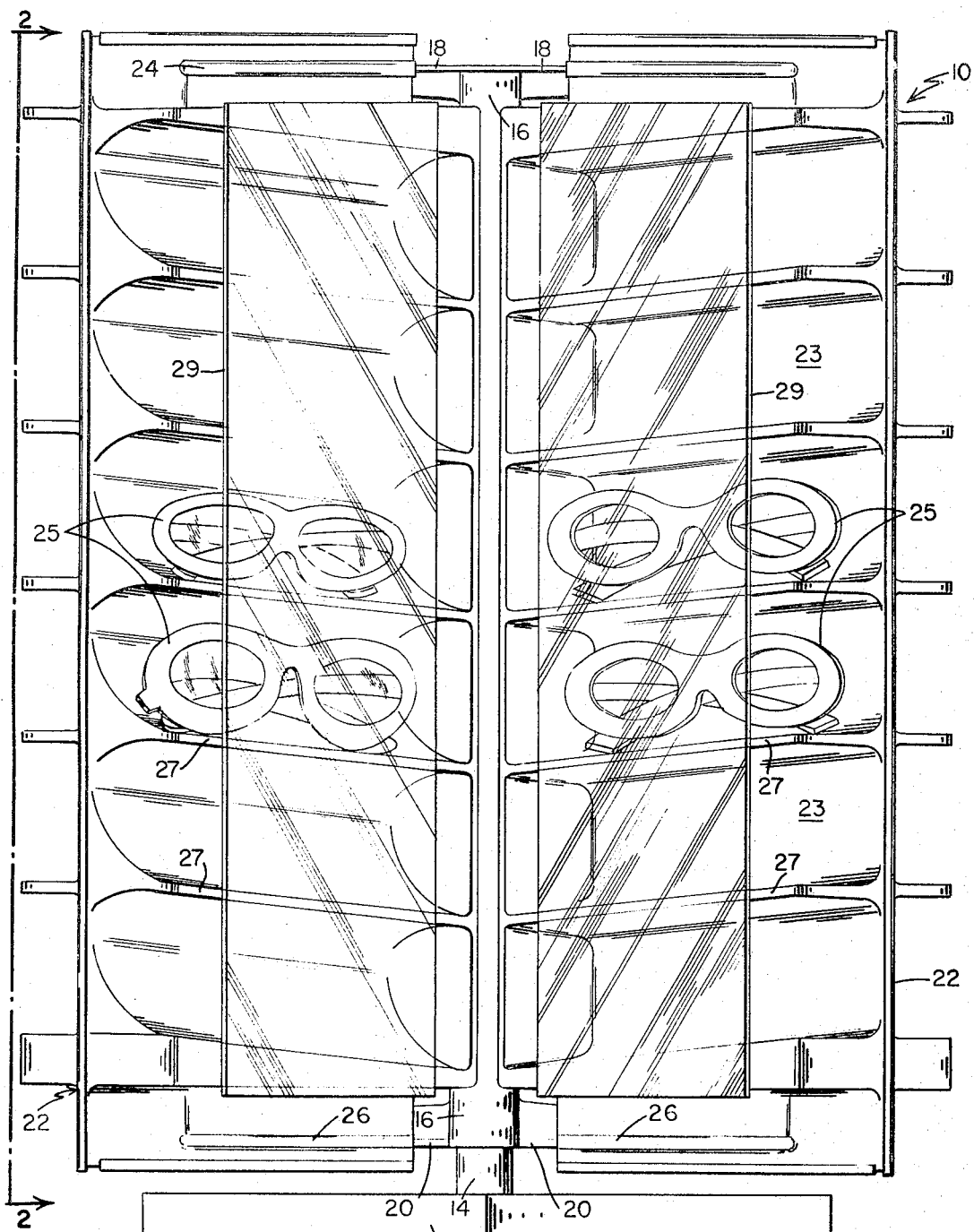
FIG. 1 is an elevational view of the display rack with display panels in place on the rack.
Figure 2:
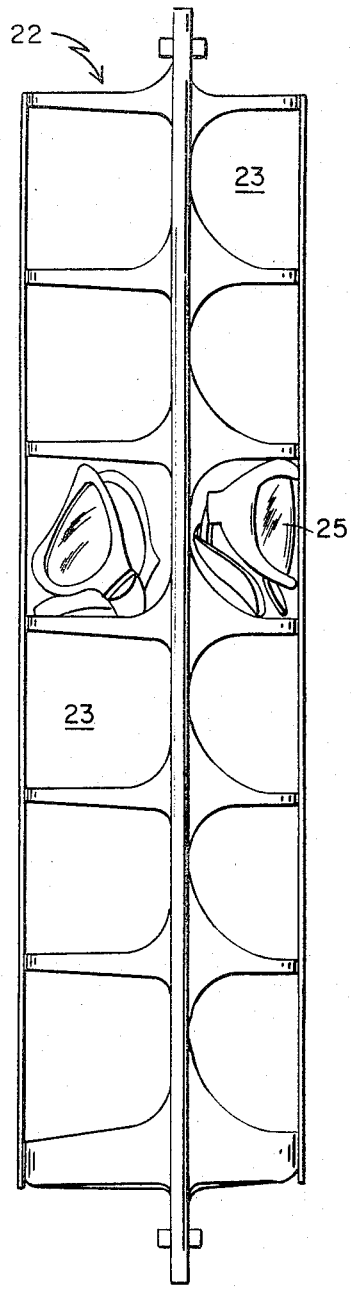
FIG. 2 is a side view of one of the display panels.
Figure 3:
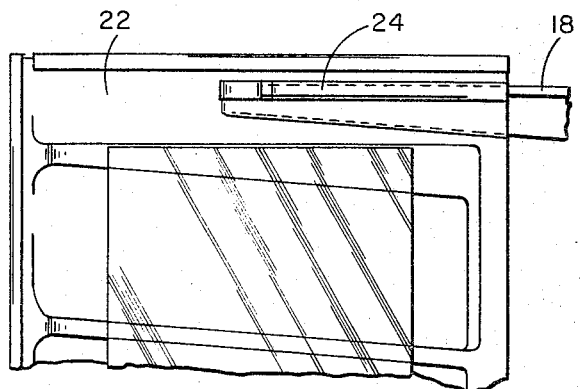
FIG. 3 is an exploded view of a portion of one of the display panels supported on a spoke member.
Figure 4:
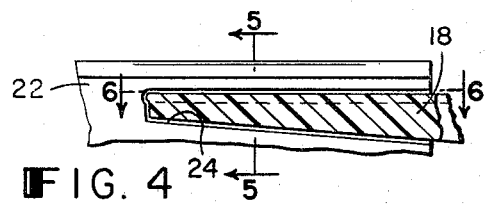
FIG. 4 is a section along lines 4—4 of FIG. 5 showing a spoke member in place in a guideway.
Figure 5:
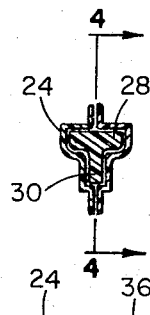
FIG. 5 is a section along lines 5—5 of FIG. 4 showing the cross sectional shape of a spoke.

The display rack 10 comprises a base 12 and a rod 14 upstanding therefrom to support a hub 16 for rotation about the rod. The hub 16 includes a plurality of spoke members 18 and 20 which extend radially from the central portion of hub 16. Spoke members 18 and 20 are located adjacent the top and bottom of the hub 16, and are adapted to support display panels 22. The display panels 22 each include guideways 24 and 26 adjacent the top and bottom thereof. The guideways 24 and 26 coact with spoke members 18 and 20 to support and retain the display panels 22 on said spoke members. The display panels on the rack, the spoke members and guideways 27 and a vertical panel 29 secured to the edges of the shelves 27 to form pockets 23 therein located on both sides thereof for the display of sunglasses 25 or the like.

In order to facilitate assembly and retention of the display panels on the rack, the spoke members and guideways are configured in such a manner as to provide easy assembly, while at the same time releasably resisting removal of the display panels from the rack. The spoke members 18 and 20 are T-shaped, and each comprises a top portion 28 and downwardly extending leg portion 30 to provide a substantially rigid member. The outer end of each spoke member is formed so as to facilitate assembly and resist removal of the panels from the spoke members.

Figure 6:
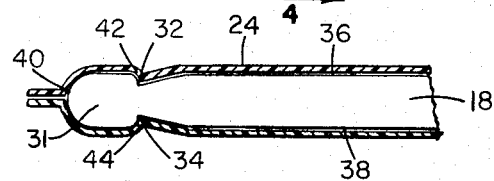
FIG. 6 is a sectional view taken along lines 6—6 of FIG. 4 showing the coaction of the cooperating retaining means on the spoke and guideway.

The top portion 28 of each spoke adjacent its end 31 is provided with notches 32 and 34 in the edges 36 and 38 thereof and terminates in end portion 40. As seen from FIG. 6, each guideway is also formed with detents 42 and 44, corresponding to notches 32 and 34 whereby the display panels 22 are releasably retained on spokes 18 and 20.

The display rack is assembled by aligning the guideways 24 and 26 of display panels 22 with spoke members 18 and 20, and sliding the display panel into position on the rack. The material of the panel is preferably constructed of resilient thermoplastic material. In this manner the detents 42 and 44 cooperating with notches 36 and 38 serve to resiliently retain the panel in place on the spokes, while at the same time permitting removal of the panel therefrom by the exercise of a strong pull on the panel which causes the detents 42 and 44 to deform and move out of the notches 32 and 34.

As is apparent from the drawings and the above specification, a display rack has been provided which is quickly and rapidly assembled and disassembled; and wherein exhausted display panels can be replaced by filled ones.

The foregoing description is to be considered exemplary rather than limiting; and the scope of the invention is to be determined from the appended claims.

What is claimed is:

1. A display rack comprising:
   a base member;
   a rod upstanding from said base member;
   a hub member supported by said rod;
   said hub member having upper and lower spokes located adjacent the top and bottom thereof and extending radially therefrom;
   a display panel, of flexible material and having shelves, supported by said spokes;
   said display panel including spaced, integral guideways therein to coincide with and receive a pair of said spokes;
   said spokes and said guideways having cooperating retaining means to releasably lock the panel in place on the display rack.

2. A display rack comprising:
   a base member;
   a rod upstanding from said base member;
   a hub member supported by said rod;
   said hub member having upper and lower spokes located adjacent the top and bottom thereof and extending radially therefrom;

a display panel, of flexible material having vertically spaced shelves on both sides thereof, supported by said spokes;

said display panel including integral guideways therein which are spaced to coincide with and receive a pair of said spokes;

said spokes and said guideways having cooperating retaining notches in the spokes and detents in the guideways, said notches and detents cooperating to releasably lock the panel in place on the display rack.

3. A display rack comprising:

a hub member;

a plurality of spokes axially spaced a predetermined distance along the hub member and extending radially therefrom;

a display panel supported by a pair of said spokes and having shelves adapted to display at least one article of merchandise;

said display panel being of flexible material and including integral guideways therein which are spaced to coincide with and receive a pair of said spokes;

said spokes and side guideways having cooperating retaining means to releasably lock the panel in place on said display rack.

References Cited

UNITED STATES PATENTS

| | | | |
|---|---|---|---|
| 1,720,053 | 7/1929 | O'Brien | 40—72 |
| 2,816,666 | 12/1957 | Nadel | 211—13 |
| 2,936,897 | 5/1960 | Bloch | 211—13 |
| 2,981,018 | 4/1961 | Hopp et al. | 40—16 |
| 3,016,638 | 1/1962 | Singer | 40—16 XR |
| 3,154,870 | 11/1964 | Hopp et al. | 40—16 XR |
| 3,216,580 | 11/1965 | Fricker | 40—16 |

ROY D. FRAZIER, *Primary Examiner.*

W. D. LOULAN, *Assistant Examiner.*